J. R. HUGHES.
Combined Flour Scoop and Sifter.

No. 213,047. Patented Mar. 11, 1879.

Witnesses.
E. A. Hemmenway.
Benj. Andrews, Jr.

Inventor:
James R. Hughes
by N. C. Lombard,
Attorney.

UNITED STATES PATENT OFFICE.

JAMES R. HUGHES, OF SAUGUS, MASSACHUSETTS.

IMPROVEMENT IN COMBINED FLOUR SCOOP AND SIFTER.

Specification forming part of Letters Patent No. 213,047, dated March 11, 1879; application filed February 3, 1879.

*To all whom it may concern:*

Be it known that I, JAMES R. HUGHES, of Saugus, in the county of Essex and State of Massachusetts, have invented certain new and useful Improvements in Combined Flour Scoops and Sifters, of which the following, taken in connection with the accompanying drawings, is a specification.

My invention relates to improvements in the construction of combined flour scoops and sifters; and it consists in a scoop made rectangular in form, as viewed in plan, with one or more of its sides flaring outward, or inclined to a perpendicular line, and having a closed bottom and circular openings in two opposite sides near said bottom, in combination with a hollow or tubular sieve mounted in said openings in the sides of the scoop, and adapted to be revolved therein and to discharge the flour from one end of said cylindrical sieve, as will be hereinafter described.

It further consists in the combination, with a flour-scoop, of a hollow or tubular sieve, mounted in bearings in the walls or sides of said scoop, near its bottom, and provided with a crank, or equivalent device, outside of the scoop, by which said cylinder may be revolved beneath the quantity of flour taken up by the scoop.

It further consists in the combination, with a flour-scoop, of a hollow or tubular sieve made open at one end and closed at the other end, and mounted in a horizontal position in the bottom of said scoop, with its periphery in close proximity to two opposite sides of the walls of the scoop, in such a manner that the flour taken up in the scoop will rest upon said cylinder or pass through its meshes to the interior thereof, and thence through the open end of said cylinder to the receptacle provided for the purpose.

It further consists in the combination of a scoop having a closed bottom, a tubular sieve mounted and adapted to be revolved within the lower portion of said scoop, and a spring or yielding plate extending across said scoop parallel with the axis and in close proximity to the periphery of said cylindrical sieve, as will be hereinafter described.

Figure 3:
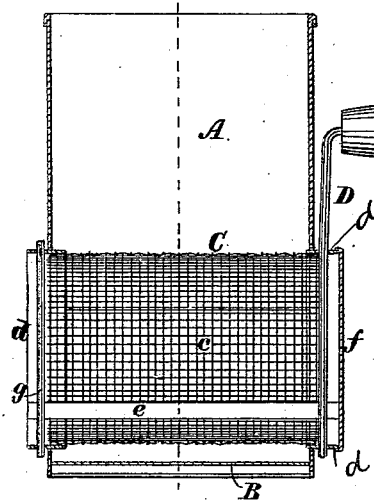
Figure 2:
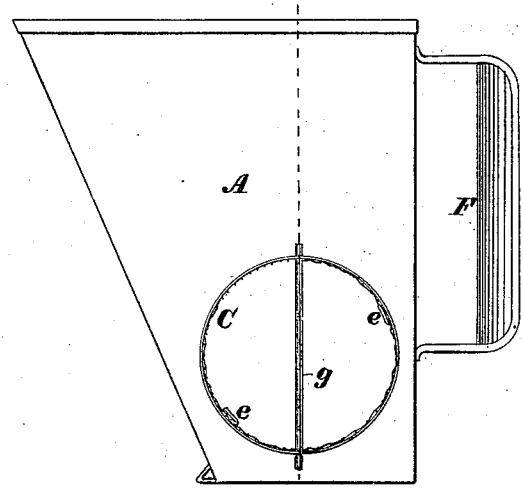
Figure 1:
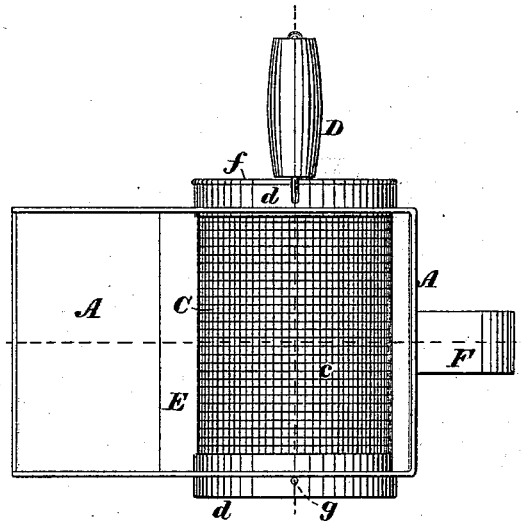

Figure 1 is a plan of my improved flour scoop and sifter. Fig. 2 is a side elevation looking at the open end of the cylindrical sieve. Fig. 3 is a vertical section cutting longitudinally through the axis of the sieve; and Fig. 4 is a vertical section cutting transversely across the axis of the cylindrical sieve, or at right angles to Fig. 3.

Figure 4:
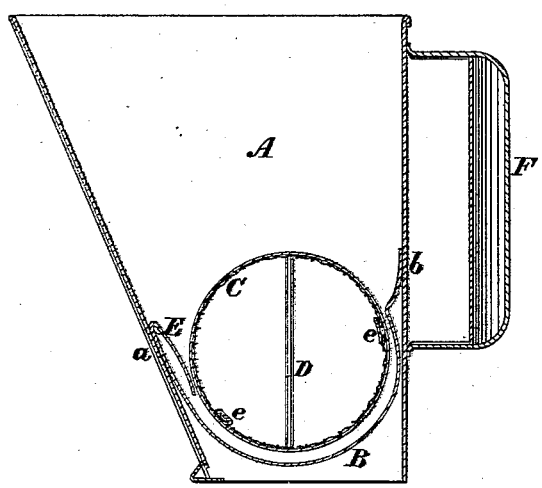

The body A of the scoop is preferably made rectangular in plan, three sides of which are made perpendicular, with one side inclined, as shown in Figs. 2 and 4, the better to adapt it to the uses of a scoop. A curved or nearly semicircular bottom, B, is secured to the front and rear walls of the body A by soldering at the points $a$ and $b$, as shown in Fig. 4. The two parallel sides of the body A have cut through them, near their bottoms, circular openings, in which is mounted the cylinder C, the main body of which is composed of fine wire-netting $c$, suitably secured to bands of sheet metal $d$ at each end of the cylinder, and longitudinal strips $e$, of the same material, so as to form a comparatively stiff hollow cylindrical sieve, one end of which is left open, and the other is closed by the cap $f$, as shown in Fig. 3.

The cylinder C is made of such a diameter as to nearly fill the lower portion of the interior of the body A, and has attached to its closed end the crank D, made from wire, and secured thereto by passing it through opposite sides of the sheet-metal hoop or band $d$, parallel with the side of the scoop, and soldering it thereto, the end of said crank-wire projecting radially a short distance outside of the hoop $d$, to serve the purpose of preventing endwise motion of the cylinder C in one direction, while it is prevented from moving in the opposite direction by the wire or bar $g$, similarly applied to the opposite end of the cylinder, as shown in Figs. 2 and 3.

A spring-plate, E, extends across the scoop parallel with the axis of the cylinder, and is secured by its upper edge to the inclined front wall of the scoop, with its lower edge in close proximity to the periphery of the cylinder C, in such a manner that it will yield slightly to allow the passage of hard foreign substances between its edge and the sieve into the space beneath the cylinder, and by its tension serve to crush any lumps of flour which may have been formed and would otherwise remain in lumps and not pass through the meshes of the sieve. F is the handle of the scoop.

I do not wish to limit myself to the use of a sieve made absolutely cylindrical in cross-section, as it is obvious that a sieve made polygonal in cross-section might be used instead of the cylinder with a good degree of success without affecting the principles of operation.

What I claim as new, and desire to secure by Letters Patent of the United States, is—

1. A flour-scoop made rectangular in plan, with two opposite sides parallel to each other and two other sides inclined to each other, and provided with a closed bottom and a circular opening through each of said parallel sides, in combination with a hollow or tubular sieve fitted to and adapted to be revolved in said circular openings and to discharge the flour from one end of said sieve, substantially as described.

2. In combination with a flour-scoop, a hollow or tubular sieve mounted in the bottom of said scoop, and projecting through the two parallel sides thereof, and provided with a crank secured thereto outside of the scoop, substantially as described.

3. In combination with a flour-scoop, a hollow or tubular sieve made open at one end and closed at the other, and mounted in suitable bearings in the bottom of said scoop, with its sides in close proximity to two opposite sides of the walls thereof, and adapted to be revolved therein and to allow the flour to pass from above said sieve into its interior and be discharged at one end thereof, substantially as and for the purposes described.

4. The combination of the scoop A, provided with the closed bottom B, the tubular sieve C, mounted in suitable bearings, and adapted to be revolved in the bottom of said scoop, and the spring or yielding plate E, all constructed, arranged, and adapted to operate substantially as and for the purposes described.

Executed at Boston, Massachusetts, this 31st day of January, A. D. 1879.

JAMES R. HUGHES.

Witnesses:
 N. C. LOMBARD,
 E. A. HEMMENWAY.